Figure 1:
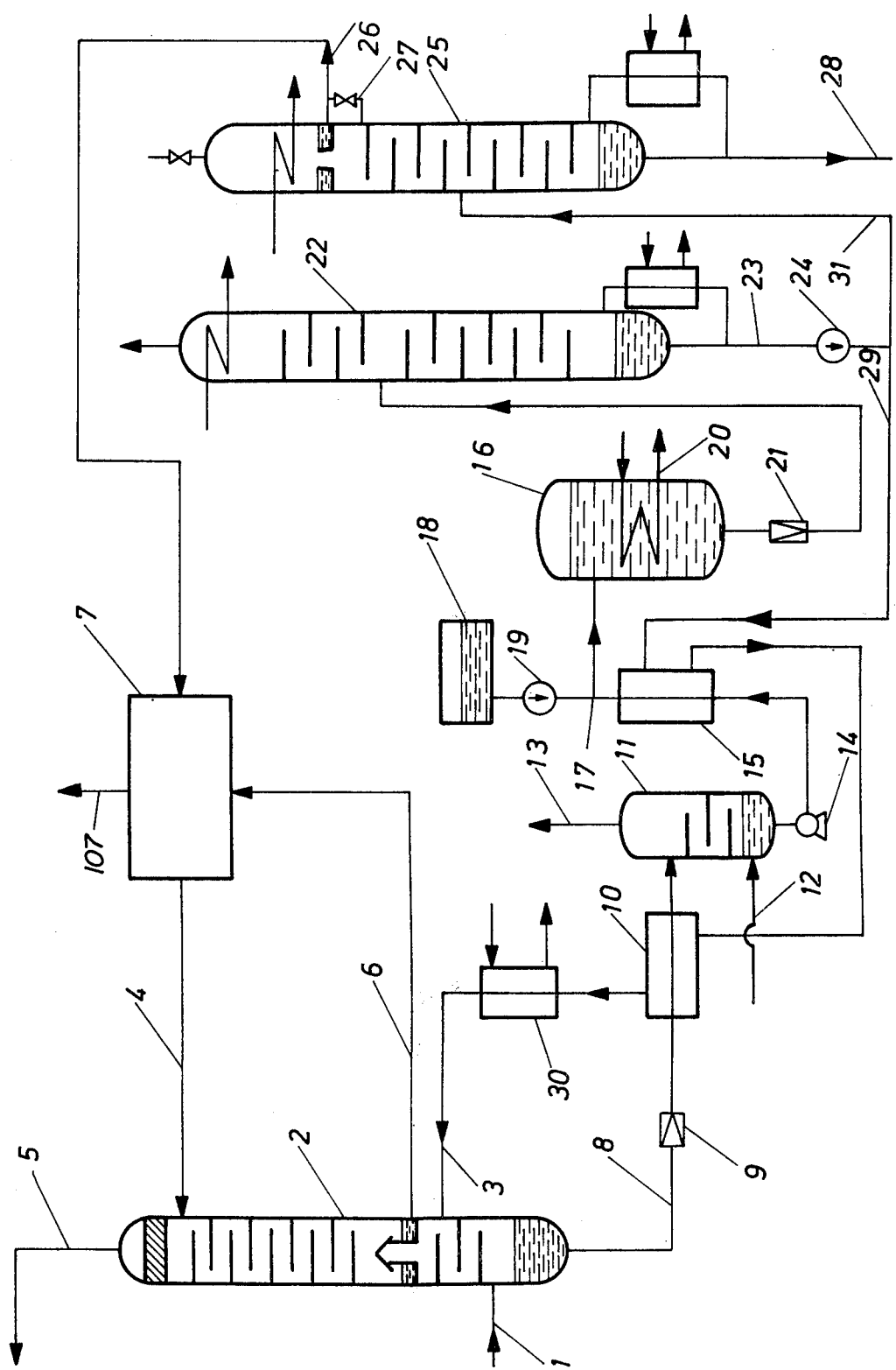

United States Patent [19]

Karwat

[11] 3,935,188

[45] Jan. 27, 1976

[54] REMOVAL OF HYDROGEN CYANIDE FROM ACIDIC GASES

[75] Inventor: Heinz Karwat, Pullach, Germany

[73] Assignee: Linde Aktiengesellschaft, Wiesbaden, Germany

[22] Filed: Dec. 10, 1973

[21] Appl. No.: 423,397

[30] Foreign Application Priority Data
Dec. 8, 1972  Germany............................ 2260248

[52] U.S. Cl. .................... 423/236; 55/68; 55/73; 260/542; 423/226; 423/355
[51] Int. Cl.² ................................................ C01C 3/00
[58] Field of Search .......... 423/226, 236; 55/68, 73; 203/37; 423/355; 260/542

[56] References Cited
UNITED STATES PATENTS

| | | | |
|---|---|---|---|
| 1,295,262 | 2/1919 | Bierbauer et al. ................... | 423/555 |
| 2,086,732 | 7/1937 | Millar et al. ........................... | 55/68 |
| 2,723,184 | 11/1955 | Creighton ............................. | 55/68 |
| 2,914,469 | 11/1959 | Anderson et al. ................... | 203/37 |
| 3,459,639 | 8/1969 | Borrel et al. ......................... | 203/37 |
| 3,664,930 | 5/1972 | Pottiez et al. ......................... | 55/68 |
| 3,773,896 | 11/1972 | Preusser et al. ..................... | 423/226 |

FOREIGN PATENTS OR APPLICATIONS

| | | | |
|---|---|---|---|
| 22,038 | 6/1906 | United Kingdom................ | 423/355 |
| 901,272 | 6/1962 | United Kingdom................ | 423/226 |

Primary Examiner—Oscar R. Vertiz
Assistant Examiner—Eugene T. Wheelock
Attorney, Agent, or Firm—Millen, Raptes & White

[57] ABSTRACT

In a process for the removal of hydrogen cyanide from raw gases containing at least one other acidic component selected from the group consisting of hydrogen sulfide, carbonyl sulfide and mixtures thereof comprising scrubbing said other components from the gases with a scrubbing agent, regenerating resultant loaded scrubbing agent, and recycling resultant regenerated scrubbing agent to the scrubbing step, the improvement wherein the hydrogen cyanide is scrubbed out simultaneously with the other acidic components, resultant loaded scrubbing agent is mixed with an aqueous alkali metal or alkaline earth hydroxide solution, and the thus-formed cyanide salt solution is thermally converted into ammonia and formate.

18 Claims, 2 Drawing Figures

REMOVAL OF HYDROGEN CYANIDE FROM ACIDIC GASES

BACKGROUND OF THE INVENTION

This invention relates to a process and apparatus for the removal of hydrogen cyanide from gases containing other acidic components, such as carbon dioxide, hydrogen sulfide, and carbonyl sulfide, wherein the other acidic components are removed from the gases by a solvent scrubbing process with a regenerable solvent.

It is common for a wide variety of gases to contain acidic gaseous impurities. For example, gaseous fuels, e.g., coke oven gas, gases from coal gasification processes, gases from distillation operations, gases from partial oxidation operations and even natural gas contain, in addition to hydrocarbons, hydrogen sulfide, carbon dioxide, carbonyl sulfide (carbon oxysulfide), and frequently other components which are particularly troublesome during further processing, such as hydrogen cyanide in particular.

To remove these acidic components, it is known (DAS [German Published Application] 1,014,278) that the gas can be subjected to a solvent scrubbing step with a scrubbing agent which dissolves such components as hydrogen sulfide from the gas and is subsequently recycled into the process after regeneration. A special problem in this procedure is caused by hydrogen cyanide, on the one hand because it is readily soluble in numerous solvents and correspondingly strongly retained in the solvents and, on the other hand, because of its corrosive action and extraordinary toxicity. Therefore, the cited process provides, prior to the actual main scrubbing step which removes the hydrogen sulfide, a preliminary scrubbing process with alkaline-adjusted water in a separate preliminary scrubbing tower which serves to remove the hydrogen cyanide before all other gas components are scrubbed out. This is done, however, at a considerable expense, since the preliminary scrubbing column must be designed to accommodate the entire quantity of gas irrespective of the relatively minor amount of hydrogen cyanide contained in the gas. Furthermore, a scrubbing step with alkaline-adjusted water is ineffective with exhaust gases having high $CO_2$ and $H_2S$ partial pressures, since carbonic acid displaces hydrocyanic acid from KCN solutions.

For this reason, preliminary scrubbing steps with untreated water are more often utilized in practice. However, in these processes, the hydrocyanic acid is obtained as a highly dilute aqueous stream giving rise to either a serious water pollution problem or —when the scrubbing water is subsequently stripped with air or the like —a serious air pollution problem.

SUMMARY

An object of the present invention is to provide an improved process and apparatus for the removal of hydrogen cyanide from gases, and particularly in those systems where the gas is subjected to a solvent scrubbing step.

Upon further study of the specification and appended claims, further objects and advantages of this invention will become apparent to those skilled in the art.

Bearing in mind the above deficiencies of the state-of-the-art, the above objects are attained.

These objects are attained according to this invention by scrubbing out the hydrogen cyanide simultaneously with the other acidic components; mixing the loaded scrubbing medium with an aqueous alkali metal or alkaline earth hydroxide solution; and then thermally decomposing the resultant cyanide salt into ammonia and formate.

In the process of the present invention, the gas containing acidic components, such as HCN, $CO_2$, $H_2S$, COS, and similar compounds, is first scrubbed in a tower with a physical scrubbing agent, e.g. methanol, under such pressure and temperature conditions that the gas is substantially freed of all acidic components.

By physical scrubbing agent is meant a solvent that makes use of the different physical solubilities of gases in this solvent. In contrast to the chemical scrubbing agents, e.g. sodium or potassium carbonate or amines, the physical scrubbing agent is inert and does not enter into any chemical reaction.

Besides the before mentioned methanol the process of the present invention may be carried out by making use of solvents which are liquids under the conditions of the process, such as hydrocarbons, alcohols, ethers, esters, halogen-carbon and halogen-hydrocarbon compounds, propylene carbonate, ethylene carbonate and tetramethylsulfone.

The loaded scrubbing agent is then partially regenerated by partial expansion and/or stripping, thus driving off a large portion, e.g. about 50 to 99.99%, preferably 99 to 99.9% of the $CO_2$ and the $H_2S$ from the scrubbing agent.

It is especially advantageous to subdivide the scrubbing tower into two sections so that the HCN, which is very readily soluble in methanol for example, is scrubbed out completely in the first, lower section and does not for all practical purposes pass into the second, upper section. It is also sufficient to effect the scrubbing process in the lower section with $CO_2$ and $H_2S$-containing scrubbing medium from the upper section or with partially regenerated, formate-containing scrubbing agent which is supplemented by $CO_2$ and $H_2S$-containing scrubbing agent from the upper section. Consequently, complete regeneration need only be conducted with respect to the scrubbing agent entering into the upper section.

After a portion of the $CO_2$ and $H_2S$ is removed from the loaded scrubbing agent, the partially regenerated scrubbing agent is mixed with sufficient alkaline solution to neutralize all the acidic components; so before adding the alkaline solution, the amount of other acidic components contained in the partially regenerated scrubbing agent is reduced as far as practical in view of the consumption of alkaline agent.

With respect to the quantity of water to be added to the alkaline solution, it is usually unnecessary to add more than about 30 % by weight of water based on the partially regenerated scrubbing agent, in order to initiate the following reaction:

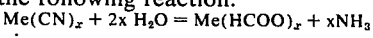

wherein

Me is an alkali or alkaline earth metal, $x$ is the valence of Me.

Accordingly, it is preferred that the water be added in a range, based on the weight of the above scrubbing solution of about 10 to 80 %, preferably 20 to 40 % by weight.

According to one embodiment of the present invention, the scrubbing agent, e.g. methanol, mixed with alkaline solution and a sufficient amount of water, and containing sodium salts of hydrocyanic acid, residual carbonic acid, and hydrogen sulfide is introduced directly into a heated reaction vessel and the reaction indicated above is conducted therein at a temperature of about 130° to 200°C, preferably 140° to 160°C, especially at 150°C, to decompose the cyanide salt in accordance with the above equation. Other cyanide salts are decomposed at the same temperature. After the decomposition reaction, the ammonia is driven out of the methanol-water-formate mixture by rectification. The formate formed during the reaction and the water are separated from the methanol in a second rectification column, the formate being discharged with the water through the sump of the column.

A further embodiment resides in feeding only a portion, e.g. about 5 to 50 %, preferably 10 to 25 % of the methanol-water-formate mixture freed of the ammonia to the methanol-water-rectification column, whereas the other portion is recycled as the scrubbing agent directly into the lower section of the scrubbing column. Surprisingly, it has been found that at a scrubbing temperature of about −30°C, approximately 1 gram-mole of sodium formate per 1 kilogram of methanol can be dissolved in a methanol solvent without the danger of solid deposits during the cooling of the scrubbing agent or during the scrubbing of $CO_2$-containing gases. In this embodiment, a further advantage resides in that it is unnecessary to feed the scrubbing agent from the upper section of the column to the lower section of the column. Accordingly, it is preferred, when working with methanol in the solvent to conduct the scrubbing in the lower section of the column at about 0° to −40°C, preferably −15° to −25°C.

In a still further embodiment of the invention, a rectification step for separating a methanol fraction and a water fraction is conducted after adding the alkaline solution. This rectification is conducted under such pressure and temperature conditions that there is substantially no decomposition of the salt of hydrocyanic acid into ammonia and formate. For it has been discovered that, although the reaction conditions become increasingly favorable for the decomposition reaction of the cyanide with increasing water content and consequently increasing temperature in the methanol-water separation column, it is possible by the use of corresponding pressure conditions, to remove the cyanides practically completely and undecomposed at the foot of the rectification column, together with the aqueous fraction. The mixture which is discharged at the foot of the column is then pumped into a dwell tank and therein decomposed into ammonia and formate. Consequently, the thus-detoxified waste water can be eliminated without danger. This avoids the disadvantage that the $NH_3$ formed during the decomposition of the cyanides enters the methanol cycle, from which it could be eliminated only at great expense.

It has been found to be especially advantageous that it is sufficient to lower the operating pressure in the rectification column only to such an extent as it is still possible to condense the methanol vapor rising in the column against normal cooling water. As a guide, the following table exemplifies preferred pressures and the temperature conditions of the rectification tower depending thereon:

| OPERATING PRESSURE Atmospheres Absolute | Temperature, Top of Column °C | Temperature, Foot of Column °C | Percentage of Cyanide decomposed per hour |
|---|---|---|---|
| 0.7 | 55 | 88 | 2 |
| 0.6 | 52 | 85 | . |
| 0.5 | 48 | 81 | . |
| 0.4 | 42 | 74 | less than 1 |

This invention is particularly advantageous in the treatment of gases of the following composition ranges:

| COMPONENT | GENERAL MOL-% | | | PREFERRED MOL-% | | |
|---|---|---|---|---|---|---|
| HCN | (10 | to | 1000) $\cdot 10^{-4}$ | (50 | to | 200) $\cdot 10^{-4}$ |
| $CO_2$ | 5 | to | 50 | 5 | to | 20 |
| $H_2S$ | 0,01 | to | 10 | 0,01 | to | 2 |
| COS | 0,001 | to | 1 | 0,001 | to | 0,2 |
| Gases substantially non-dissolvable in the scrubbing solvent, e.g. hydrocarbons, $N_2$, $H_2$, Ar, CO | 95 | to | 39 | 95 | to | 78 |

DESCRIPTION OF PREFERRED ILLUSTRATED EMBODIMENTS

Figure 2:
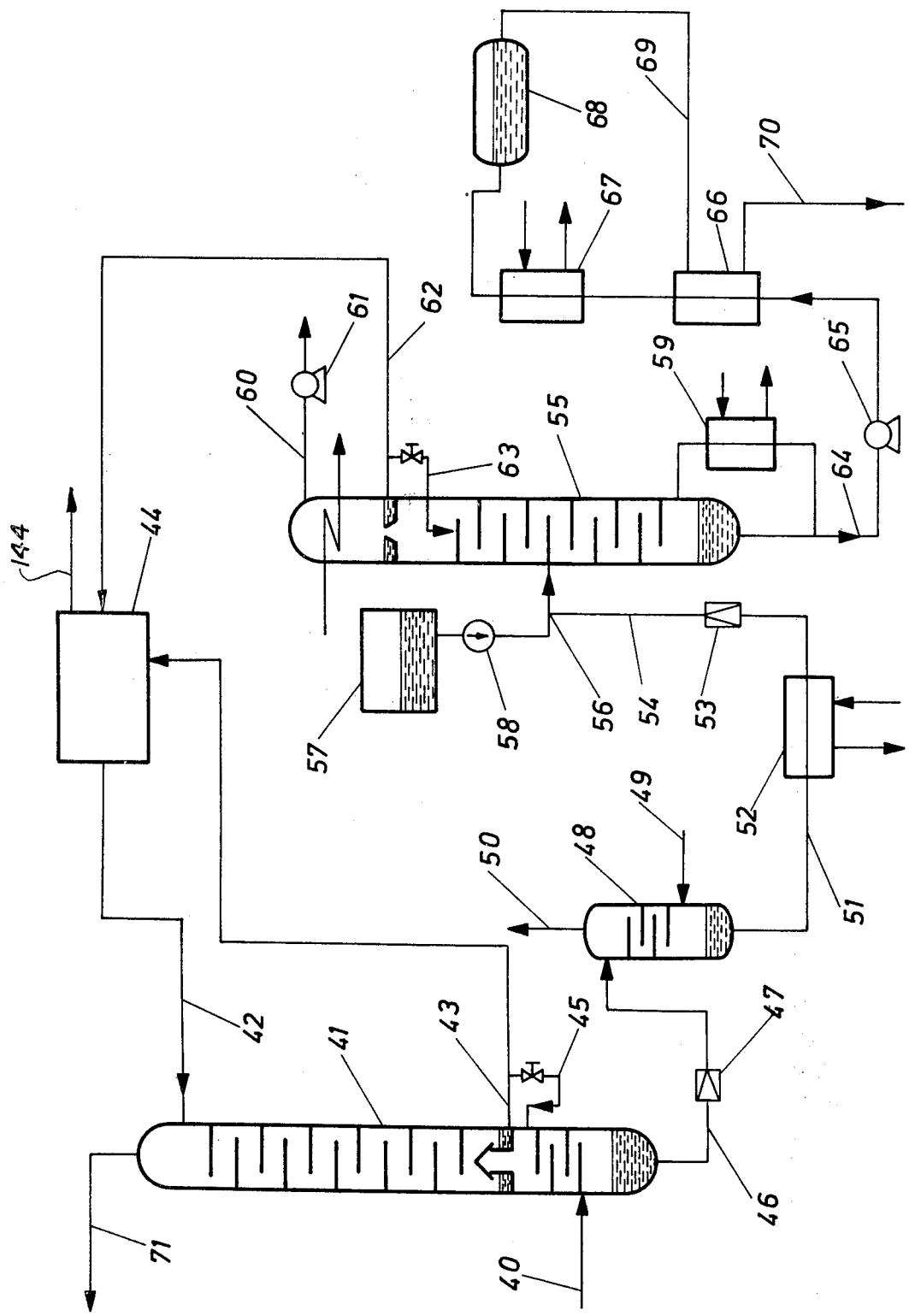

FIG. 1 is a schematic of a plant for the removal of hydrogen cyanide wherein the decomposition of the cyanide solution is effected in the methanolic solution, and FIG. 2 is a schematic of a plant for the removal of hydrogen cyanide wherein the cyanide solution is decomposed after separating a methanol fraction.

In FIG. 1, 20,000 $Nm^3/h$. of a gas having the following composition:

| | |
|---|---|
| $H_2 + CO$ | 86.0 vol. % |
| $N_2 + Ar$ | 1.5 vol. % |
| $CO_2$ | 12.0 vol. % |
| $H_2S$ | 0.5 vol. % |
| HCN | 120 mg./$Nm^3$ | is fed via conduit 1 to a scrubbing column 2. This column is subdivided by a vapor flue in a collecting plate into an upper section and a lower section. In the lower section, the gas is first freed of HCN and of smaller amounts of $H_2S$ and $CO_2$ by a scrubbing agent fed through conduit 3, which is in detail below. The gas then passes through the vapor flue into the upper section, where it flows countercurrently to completely regenerated scrubbing agent, e.g. methanol, fed via conduit 4 at a temperature of −45°C and in an amount of about 50 t./h.

A pressure of 30 atmospheres absolute is present in column 2. Gas substantially completely freed of acidic components leaves the scrubbing column 2 at the top via conduit 5. The scrubbing agent from the upper section of the scrubbing column 2, loaded primarily with $CO_2$ and $H_2S$, is withdrawn via conduit 6 and fed to a regenerating plant 7, shown in block diagram form, where $H_2S$ and $CO_2$ are completely removed via conduit 107 from the scrubbing agent, and the regenerated solvent is again cooled to the scrubbing temperature. The loaded scrubbing agent from the lower section of the scrubbing column 2 having a temperature of about −25°C., is discharged via conduit 8, expanded in vlave 9 to a pressure of about 1 atm. abs., warmed in heat exchanger 10, and fed into a smalal stripping column 11. Via conduit 12, about 20 Nm³h. of nitrogen as the stripping gas is introduced under pressure into the foot of the stripping column 11. At the head of the stripping column, there is withdrawn via conduit 13, hydrogen, carbon monoxide, and a considerable portion of the carbon dioxide and hydrogen sulfide dissolved in the scrubbing agent, as well as the stripping nitrogen.

The thus partially regenerated scrubbing agent is brought to a pressure of about 15 atm. abs. by means of a pump 14, further warmed in heat exchanger 15, and then fed into a reactor 16. Previously, sodium hydroxide solution from a storage tank 18 was admixed to the scrubbing agent at 17 with the aid of a metering pump 19. By means of a steam heater 20, a temperature of 150°C is maintained in the reactor 16. The reaction of the sodium cyanide (formed by adding the alkaline solution) with water takes place in this reactor 16, with the formation of sodium formate and ammonia. The sodium formate-ammonia-solvent mixture is withdrawn at the bottom of the reactor, expanded in valve 21 to a pressure of about 2 atm. abs., and introduced into an ammonia stripping column 22.

The ammonia stripper is provided at its head with a cooling coil provided with cooling water and at its sump with a steam-operated forced circulation heater. In this stripper, the ammonia which was formed during the reaction in the reactor 16 is stripped out. The solution, free of ammonia, leaves the stripper via conduit 23 and is pumped, with the aid of pump 24, largely via conduit 31 to a methanol-water separation column 25.

The methanol-water separation column is equipped with a head cooler and a sump heater. In this column 25, the methanol-water mixture is separated into pure methanol which is withdrawn at the head via conduit 26, conveyed into the plant 7, and combined therein with the scrubbing agent stemming from the upper section of the scrubbing column 2. Some pure methanol is of course refluxed to the column as reflux via conduit 27. The waste water, containing sodium formate, is discharged from the bottom of the column 25 via conduit 28.

Another portion of the mixture withdrawn from the ammonia stripper 22 is branched off via conduit 29, cooled in heat exchangers 15 and 10, further cooled in aftercooler 30 to a temperature of −30°C, and then reintroduced via conduit 3 to the head of the lower scrubbing section.

In FIG. 2, 20,000 Nm³h. of a gas having the following composition:

| | |
|---|---|
| $H_2 + CO$ | 86.0 vol. % |
| $N_2 + Ar$ | 1.5 vol. % |
| $CO_2$ | 12.0 vol. % |
| $H_2S$ | 0.5 vol. % |
| HCN | 120 mg./Nm³ | is fed via conduit 40 into a scrubbing column 41. The scrubbing column 41 is subdivided into an upper section and a lower section by a vapor flue and a collecting plate. About 50 t./h. of pure scrubbing agent, e.g. methanol, is introduced via conduit 42 into the scrubbing column 41 at a temperature of −45°C. The pressure in the scrubbing column 41 is 30 atm. abs. The methanol, loaded primarily with $CO_2$ and $H_2S$, is withdrawn from the upper section via conduit 43 and fed largely to a scrubbing agent processing plant 44 which removes $CO_2$ and $H_2S$ via conduit 144, and, via conduit 42, yields pure, cold scrubbing agent. Gas freed of acidic components leaves column 41 via conduit 71. A small portion of the loaded scrubbing agent from the upper section is branched off via conduit 45 and fed into the lower section of the scrubbing column 41, where this portion of the scrubbing agent serves primarily for the purpose of scrubbing out HCN.

The scrubbing agent, loaded with $CO_2$, $H_2S$, and HCN, exits from the scrubbing column 41 via conduit 46 at a temperature of −25°C and is expanded in valve 57 to a pressure of about 1 atm. abs. At this pressure, the scrubbing agent enters a small stripping column 48, where it flows countercurrently to stripping gas, e.g. nitrogen, in an amount of 20 Nm³h., fed from the bottom via conduit 49. Via conduit 50, a mixture of $CO_2$, $H_2S$, some $H_2 + CO$, and stripping gas is discharged at the head of the stripping column. The scrubbing agent, which still contains HCN, is withdrawn via conduit 51, warmed in heat exchanger 52, expanded in valve 53 to a pressure of about 0.8 atm. abs., and introduced via conduit 54 to a water-methanol separation column 55, but only after a sufficient amount of aqueous sodium hydroxide solution from the storage tank 57 has been added at 56 to the scrubbing agent by means of pump 58.

The water-methanol separating column 55 is equipped at the head with a cooling unit operated with cooling water and at the sump with a stream-operated forced-circulation heater 59. Furthermore, the column 55 is provided at the head with a conduit 60 and a suction blower 61 which maintains a pressuer of 0.5 atm. abs. in the column. Under these pressure conditions, the scrubbing agent in the column 55 is separated into an aqueous fraction (about 80°C) which collects in the sump, and into a methanol fraction which is largely withdrawn via conduit 62 and introduced into the plant 44 where it is combined with the remaining scrubbing agent, while a certain portion is reintroduced through conduit 63 into column 55 as reflux having a temperature of about 48°C.

The aqueous fraction in the sump, which contains sodium cyanide, is withdrawn via conduit 64, brought to a pressure of about 15 atm. abs. by a pump 65, and is then heated in heat exchanger 66 and in the steam heated unit 67 to a temperature of 150°C and introduced into a dwell tank 68, where the scrubbing agent remains for about 15–30 minutes, during which time the sodium cyanide is decomposed into sodium formate and ammonia. The water, containing ammonia and sodium formate is removed via conduit 69, cooled in heat exchanger 66 against undecomposed solution, and is then discharged via conduit 70 into the sewage system.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the removal of hydrogen cyanide from gases containing at least one other acidic component selected from the group consisting of hydrogen sulfide, carbonyl sulfide and mixtures thereof comprising scrubbing said hydrogen cyanide and said at least one other acidic component from the gases with a physical scrubbing agent, regenerating resultant loaded scrubbing agent, and recycling resultant regenerated scrubbing agent to the scrubbing step, the improvement wherein as part of said regenerating, the resultant loaded physical scrubbing agent containing said hydrogen cyanide is mixed with an aqueous alkali metal or alkaline earth hydroxide solution, and the thus-formed cyanide salt solution is thermally decomposed into ammonia and formate according to the following reaction:

$$Me(CN)_x + 2x\ H_2O = Me(HCOO)_x + xNH_3$$

wherein
Me is an alkali or alkaline earth metal,
$x$ is the valence of Me.

2. A process according to claim 1 wherein the loaded scrubbing agent is mixed, prior to the decomposition step, with sufficient water for the reaction but not more than about 30% by weight based on the weight of the scrubbing solution.

3. A process according to claim 1, wherein prior to the thermal decomposition step, the scrubbing agent mixed with the aqueous hydroxide solution is separated by distillation into a scrubbing agent fraction and into a water fraction without decompositiion of the cyanide, and thereafter the cyanide present in the water fraction is thermally decomposed into ammonia and formate.

4. A process according to claim 3, wherein the distillation is effected under vacuum.

5. A process according to claim 1 wherein the thermal decomposition occurs at about 150°C.

6. A process according to claim 1 comprising removing a portion of said other acidic components dissolved in the loaded scrubbing agent prior to adding the aqueous alkali metal or alkaline earth hydroxide solution thereto.

7. A process according to claim 1, comprising liberating ammonia from the solution containing ammonia and formate, and employing at least a portion of resultant formate-containing solution as the physical scrubbing agent to scrub out hydrogen cyanide from the gas.

8. A process according to claim 1, wherein the water content of the scrubbing solution which is subjected to decomposition is about 10 to 80% by weight.

9. A process according to claim 1, wherein the water content of the scrubbing solution which is subjected to decomposition is about 20 to 40% by weight.

10. A process according to claim 1, wherein the thermal decomposition occurs at 130°-200°C.

11. A process according to claim 1, wherein the thermal decomposition occurs at 140°-160°C.

12. A process according to claim 7, wherein said scrubbing of hydrogen cyanide is conducted at about 0° to −40°C.

13. A process according to claim 7, wherein said scrubbing of hydrogen cyanide is conducted at about −15° to −25°C.

14. A process according to claim 1, comprising rectifying resultant solution of physical scrubbing agent containing water, formate and ammonia in two distillation stages to liberate ammonia in a first stage and to separate water plus formate from the physical scrubbing agent in a second stage.

15. A process according to claim 7, comprising rectifying another portion of resultant formate-containing solution to separate the physical scrubbing agent therefrom.

16. A process accordin to claim 15, wherein the scrubbing of the gas is conducted in two serially connected stages, in a first stage employing said formate-containing solution to scrub out only hydrogen cyanide substantially completely, and in a second stage employing said rectified physical scrubbing agent to scrub out remaining other acidic components substantially completely.

17. A process according to claim 16, comprising removing a portion of said other acidic components dissolved in the loaded scrubbing agent prior to adding the aqueous alkali metal or alkaline earth hydroxide solution thereto.

18. A process according to claim 3, comprising removing a portion of said other acidic components dissolved in the loaded scrubbing agent prior to adding the aqueous alkali metal or alkaline earth hydroxide solution thereto.

* * * * *